US008586263B2

(12) United States Patent
Son

(10) Patent No.: US 8,586,263 B2
(45) Date of Patent: Nov. 19, 2013

(54) FUEL CELL ELECTRODE, MEMBRANE-ELECTRODE ASSEMBLY AND FUEL CELL SYSTEM INCLUDING MEMBRANE-ELECTRODE ASSEMBLY

(75) Inventor: In-Hyuk Son, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1703 days.

(21) Appl. No.: 11/730,697

(22) Filed: Apr. 3, 2007

(65) Prior Publication Data

US 2007/0243448 A1    Oct. 18, 2007

(30) Foreign Application Priority Data

Apr. 3, 2006  (KR) .................. 10-2006-0030109

(51) Int. Cl.
*H01M 4/02* (2006.01)
*H01M 4/36* (2006.01)

(52) U.S. Cl.
USPC .......................................... 429/523; 429/524

(58) Field of Classification Search
USPC .................................................. 429/523
See application file for complete search history.

(56) References Cited

U.S. PATENT DOCUMENTS

| | | | | |
|---|---|---|---|---|
| 3,346,421 A | * | 10/1967 | Thompson et al. | 429/42 |
| 3,357,863 A | * | 12/1967 | Ziering | 429/41 |
| 3,977,901 A | * | 8/1976 | Buzzelli | 429/40 |
| 4,444,852 A | * | 4/1984 | Liu et al. | 429/29 |
| 5,318,862 A | * | 6/1994 | Liu et al. | 429/27 |
| 5,821,185 A | * | 10/1998 | White et al. | 502/4 |
| 7,001,581 B2 | * | 2/2006 | Kawakami et al. | 423/447.3 |
| 2002/0068213 A1 | | 6/2002 | Kaiser et al. | |
| 2003/0183080 A1 | * | 10/2003 | Mundschau | 95/55 |
| 2003/0186109 A1 | | 10/2003 | Huang et al. | |
| 2003/0215697 A1 | * | 11/2003 | Chuang et al. | 429/40 |
| 2004/0058227 A1 | | 3/2004 | Tanaka et al. | |
| 2004/0247991 A1 | | 12/2004 | Suzuki et al. | |
| 2006/0188774 A1 | * | 8/2006 | Niu et al. | 429/44 |
| 2006/0211891 A1 | * | 9/2006 | Hirota et al. | 568/391 |
| 2007/0231675 A1 | * | 10/2007 | Son | 429/44 |

FOREIGN PATENT DOCUMENTS

| | | |
|---|---|---|
| KR | 1020060001455 | 1/2006 |
| WO | WO 2004091784 A1 * | 10/2004 |

OTHER PUBLICATIONS

Joongpyo Shim, Chang-Rae Lee, Hong-Ki Lee, Ju-Seong Lee, Elton J. Cairns."Electrochemical characteristics of Pt-WO3/C and Pt-TiO2/C electrocatalysts in a polymer electrolyte fuel cell", Journal of Power Sources 102, 2001, pp. 172-177. (Korean Office Action dated Feb. 6, 2013 in corresponding Korean Patent Application No. 10-2006-0030109).

Korean Office Action dated Feb. 6, 2013 in corresponding Korean Patent Application No. 10-2006-0030109 and Request for Entry of the Accompanying Office Action attached herewith.

(Continued)

*Primary Examiner* — Ula C Ruddock
*Assistant Examiner* — Jacob Marks
(74) *Attorney, Agent, or Firm* — Robert E. Bushnell, Esq.

(57) ABSTRACT

The electrode for a fuel cell includes an electrode substrate and a catalyst layer disposed on the electrode substrate. The catalyst layer includes a first catalyst including a tungsten-containing compound and a second catalyst including a noble metal.

15 Claims, 2 Drawing Sheets

(56) References Cited

OTHER PUBLICATIONS

Exhibit I: A copy of hyperlink: http://www.princeton.edu/~pccm/outreach/scsp/mixturesandsolutions/background.htm.

Exhibit II: A copy of hyperlink: http://www.enchantedlearning.com/physics/reactions.shtml.

Exhibit III: A copy of hyperlink: http://en.wikipedia.org/wiki/Polylysine.

Exhibit IV: A copy of hyperlink: http://en.wikipedia.org/wiki/Amine.

* cited by examiner

FUEL CELL ELECTRODE, MEMBRANE-ELECTRODE ASSEMBLY AND FUEL CELL SYSTEM INCLUDING MEMBRANE-ELECTRODE ASSEMBLY

CLAIM OF PRIORITY

This application makes reference to, incorporates the same herein, and claims all benefits accruing under 35 U.S.C. §119 from an application for ELECTRODE FOR FUEL CELL AND, MEMBRANE-ELECTRODE ASSEMBLY AND FUEL CELL SYSTEM INCLUDING SAME earlier filed in the Korean Intellectual Property Office on the 3 Apr. 2006 and there duly assigned Serial No. 10-2006-0030109.

BACKGROUND OF THE INVENTION

1. Field of the Invention

The present invention relates to an electrode for a fuel cell, and a membrane-electrode assembly and fuel cell system including the membrane-electrode assembly. More particularly, the present invention relates to an electrode for a fuel cell that can lower the cost of a fuel cell and implement a high power fuel cell, and a membrane-electrode assembly and fuel cell system including the membrane-electrode assembly.

2. Description of the Related Art

A fuel cell is a power generation system for producing electrical energy through an electrochemical redox reaction of an oxidant and a fuel, such as hydrogen, or a hydrocarbon-based material such as methanol, ethanol, natural gas, and the like. The polymer electrolyte fuel cell is a clean energy source that is capable of replacing fossil fuels. It has advantages, such as high power output density and energy conversion efficiency, operability at room temperature, and being small-sized and tightly sealed. Therefore, it can be applicable to a wide array of fields, such as non-polluting automobiles, and electricity generation systems and portable power sources for mobile equipment, military equipment, and the like.

Representative exemplary fuel cells include Polymer Electrolyte Membrane Fuel Cells (PEMFCs) and Direct Oxidation Fuel Cells (DOFCs). The DOFC includes a direct methanol fuel cell that uses methanol as a fuel.

The PEMFC has an advantage of a high energy density and high power, but it also has problems in the need to carefully handle hydrogen gas and the requirement for accessory facilities, such as a fuel reforming processor for reforming methane or methanol, natural gas, and the like in order to produce hydrogen as the fuel gas.

On the contrary, a DOFC has a lower energy density than that of the polymer electrolyte fuel cell, but has the advantages of easy handling of the liquid-type fuel, a low operation temperature, and no need for additional fuel reforming processors.

In the above-mentioned fuel cell system, a stack that generates electricity includes several to scores of unit cells stacked adjacent to one another, and each unit cell is formed of a Membrane-Electrode Assembly (MEA) and a separator (also referred to as a bipolar plate). The MEA is composed of an anode (also referred to as a "fuel electrode" or an "oxidation electrode") and a cathode (also referred to as an "air electrode" or a "reduction electrode") that are separated by a polymer electrolyte membrane.

A fuel is supplied to the anode and adsorbed on catalysts of the anode, and the fuel is oxidized to produce protons and electrons. The electrons are transferred into the cathode via an external circuit, and the protons are transferred into the cathode through the polymer electrolyte membrane. In addition, an oxidant is supplied to the cathode, and then the oxidant, protons, and electrons react on catalysts of the cathode to produce electricity along with water.

SUMMARY OF THE INVENTION

One embodiment of the present invention provides an electrode that can lower the cost of a fuel cell and that has improved catalyst efficiency.

Another embodiment of the present invention provides a membrane-electrode assembly that includes the electrode.

Yet another embodiment of the present invention provides a fuel cell system that includes the membrane-electrode assembly.

According to one embodiment of the present invention, an electrode for a fuel cell includes an electrode substrate and a catalyst layer disposed on the electrode substrate. The catalyst layer includes a first catalyst including a tungsten-containing compound and a second catalyst including a noble metal.

The tungsten-containing compound includes at least one compound selected from a group consisting of tungsten nitride, tungsten phosphide, tungsten sulfide, and combinations thereof. According to one embodiment, tungsten phosphide may be used.

The second catalyst includes the noble metal selected from a group consisting of Pt, Ru, Pd, Au, Rh, Ag, Ir, Os, Re, and combinations thereof.

The electrode may be used for an anode of a fuel cell.

According to another embodiment of the present invention, a membrane-electrode assembly for a fuel cell includes an anode and a cathode facing each other and a polymer electrolyte membrane interposed therebetween. At least one of the anode and the cathode is the above-noted electrode.

According to yet another embodiment of the present invention, a fuel cell system includes an electricity generating element that includes the above-noted membrane-electrode assembly and a separator positioned on each side of the membrane-electrode assembly, a fuel supplier that supplies the electricity generating element with a fuel, and an oxidant supplier that supplies the electricity generating element with an oxidant.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
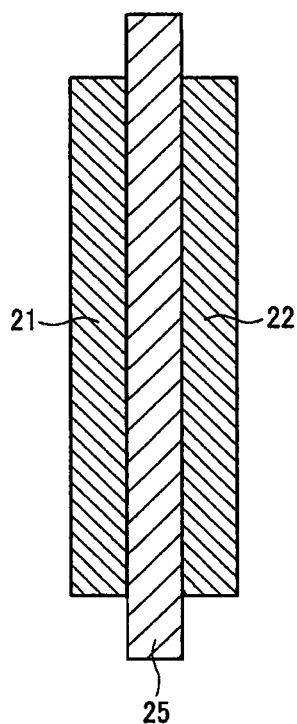
FIG. 1 is a schematic cross-sectional view of a membrane-electrode assembly according to an embodiment of the present invention.

Exemplary embodiments of the present invention are described in detail below with reference to the accompanying drawings.

The present invention relates to an electrode for a fuel cell. In general, a noble metal, such as Pt or Ru, has been used for a catalyst for an electrode of a fuel cell. However, such a catalyst has a high cost and also may form an agglomerate during sintering, which may deteriorate catalyst activity.

According to one embodiment of the present invention, a tungsten-containing compound is included along with a noble-metal-based catalyst in an electrode catalyst layer.

The electrode for a fuel cell includes an electrode substrate and a catalyst layer disposed on the electrode substrate. The catalyst layer includes a first catalyst that includes a tungsten-containing compound, and a second catalyst including a noble metal.

The tungsten-containing compound includes at least one compound selected from a group consisting of tungsten nitride, tungsten phosphide, tungsten sulfide, and combinations thereof. According to one embodiment of the present invention, tungsten phosphide may be used.

The tungsten nitride includes WN or $W_2N$, the tungsten phosphide includes WP or $W_2P$, and the tungsten sulfide includes WS or $WS_2$.

The second catalyst including the noble metal may be selected from a group consisting of Pt, Ru, Pd, Au, Rh, Ag, Ir, Os, Re, and combinations thereof.

The first and second catalysts may be used in the form of a catalytic metal itself (black catalyst), or can be used while being supported on a carrier.

When the catalyst is used in the form of a catalytic metal itself, that is, as a black catalyst not supported on a carrier, the first and second catalysts can be simply mixed. According to the embodiment of the present invention, the first and second catalysts can be mixed in a ratio of 99 to 50:1 to 50 wt %. According to another embodiment of the present invention, the first and second catalysts can be mixed in a ratio of 90 to 60:10 to 40 wt %. When the second catalyst is used in an amount of less than 1 wt %, the second catalyst may have little effect. On the contrary, when it is used in an amount of more than 50 wt %, the second catalyst may be excessively used and thereby, agglomerated.

Alternatively, when the catalyst is used in the form of a catalytic metal itself, that is, a black catalyst not supported on a carrier, the second catalyst can be supported on the first catalyst. In other words, the first catalyst can play a role of a carrier as well as a catalyst. 0.01 to 50 parts by weight of the second catalyst is supported on 99.99 to 50 parts by weight of the first catalyst. According to another embodiment, 1 to 40 parts by weight of the second catalyst is supported on 60 to 99 parts by weight of the first catalyst. When the second catalyst is used in an amount of less than 0.01 wt %, the second catalyst may have little effect. On the contrary, when it is used in an amount of more than 50 parts by weight, the second catalyst may cover the first catalyst and thereby increase the size of catalyst particles, thereby deteriorating catalyst activity.

In addition, the first and second catalysts can be respectively supported on first and second carriers or on one carrier at the same time. Regardless of their support, the supported catalyst can improve conductivity and lower catalyst resistance.

The carrier may include a carbon, such as activated carbon, denka black, ketjen black, acetylene black, or graphite, or an inorganic particulate, such as alumina, silica, zirconia, or titania. Carbon is generally used as the carrier.

In one embodiment of the present invention, the electrode substrates are formed from a material, such as carbon paper, carbon cloth, carbon felt, or a metal cloth (a porous film composed of metal fiber or a metal film disposed on a surface of a cloth composed of polymer fibers). The electrode substrate is not limited thereto. The electrode substrates provide a path for transferring reactants, such as a fuel, e.g., a hydrocarbon fuel, carboxylic acid, and an oxidant to the catalyst layers.

The electrode substrates may be treated with a fluorine-based resin to be water-repellent to prevent a reduction in the diffusion efficiency due to water generated during operation of the fuel cell. The fluorine-based resin may include, but is not limited to, polyvinylidene fluoride, polytetrafluoroethylene, fluorinated ethylene propylene, polychlorotrifluoroethylene, a fluoroethylene polymer, or a copolymer thereof.

A microporous layer can be added between the aforementioned electrode substrates and catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material, such as carbon nanotubes, carbon nanofibers, carbon nanowires, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohols such as ethanol, isopropyl alcohol, n-propyl alcohol, butanol, and so on, water, dimethyl acetamide, dimethyl sulfoxide, N-methylpyrrolidone, and tetrahydrofuran.

The coating method may include, but is not limited to, screen printing, spray coating, doctor blade methods, gravure coating, dip coating, silk screening, painting, and so on, depending on the viscosity of the composition.

The catalyst layers may include a binder resin to improve adherence and proton transfer properties.

The binder resin may be a proton conductive polymer resin having a cation exchange group selected from a group consisting of a sulfonic acid group, a carboxylic acid group, a phosphoric acid group, a phosphonic acid group, and derivatives thereof at its side chain. Non-limiting examples of the polymer include at least one proton conductive polymer selected from a group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one polymer selected from a group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2, 5-benzimidazole).

The binder resins may be used singularly or in combination, and they may be used along with non-conductive polymers to improve adherence with a polymer electrolyte membrane. The binder resins may be used in a controlled amount to adapt to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

According to another embodiment of the present invention, a membrane-electrode assembly includes the anode and the cathode having the structure as above, and a polymer electrolyte membrane interposed between the cathode and the anode. The membrane-electrode assembly 20 is schematically shown in FIG. 1. Referring to FIG. 1, the membrane-electrode assembly 20 includes a polymer electrolyte membrane 25, and a cathode 21 and an anode 22 respectively disposed either side of the polymer electrolyte membrane 25.

Either or both of the cathode 21 and the anode 22 may be composed of the above described electrode. In the case that either of the cathode 21 and the anode 22 is the above electrode, the other electrode may include any catalyst that can perform a fuel cell reaction. The catalyst includes platinum-based catalysts. The platinum-based catalyst includes platinum, ruthenium, osmium, a platinum-ruthenium alloy, a platinum-osmium alloy, a platinum-palladium alloy, a platinum-M alloy, or combinations thereof, where M is a transition element selected from a group consisting of Ga, Ti, V, Cr, Mn, Fe, Co, Ni, Cu, Zn, Sn, Mo, W, Rh, Ru, and combinations thereof. Representative examples of the catalysts include at least one catalyst selected from a group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

The polymer electrolyte membrane functions as an ion-exchange member to transfer protons generated in an anode catalyst layer of the cathode catalyst layer. The polymer electrolyte membrane of the membrane-electrode assembly may include a proton conductive polymer resin. The proton conductive polymer resin may be a polymer resin having a cation exchange group selected from a group consisting of a sulfonic acid group, a carboxylic acid group, a phosphoric acid group, a phosphonic acid group, and derivatives thereof, at its side chain.

Non-limiting examples of the polymer resin include at least one resin selected from a group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one preferred embodiment of the present invention, the proton conductive polymer is at least one polymer selected from a group consisting of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The hydrogen (H) in the proton conductive group of the proton conductive polymer can be replaced by Na, K, Li, Cs, or tetrabutylammonium. When the H in the ionic exchange group of the terminal end of the proton conductive polymer side is replaced by Na or tetrabutylammonium, NaOH or tetrabutylammonium hydroxide may also be used, respectively. When the H is replaced by K, Li, or Cs, suitable compounds for the substitutions may be used. Since such a substitution is known in this art, a detailed description thereof has been omitted.

A fuel cell system including the membrane-electrode assembly of the present invention includes at least one electricity generating element, a fuel supplier, and an oxidant supplier.

The electricity generating element includes a membrane-electrode assembly and a separator. It generates electricity through oxidation of a fuel and reduction of an oxidant.

The fuel supplier plays a role of supplying the electricity generating element with a fuel. The fuel includes liquid or gaseous hydrogen, or a hydrocarbon-based fuel, such as methanol, ethanol, propanol, butanol, or natural gas.

Figure 2:
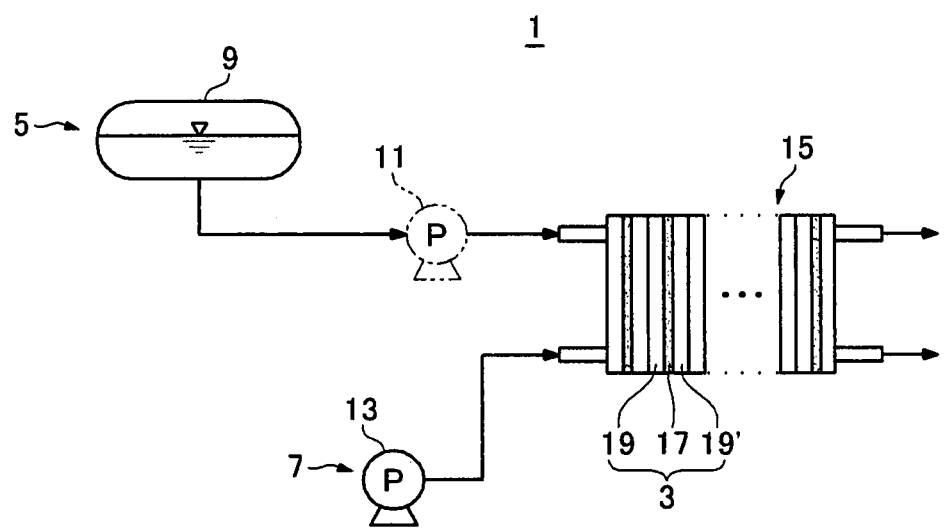
FIG. 2 is a view of a structure of a fuel cell system according to an embodiment of the present invention.

FIG. 2 is a view of a structure of a fuel cell system described in detail below with reference to this accompanying drawing as follows. FIG. 2 is a view of a fuel cell system wherein a fuel and an oxidant are provided to the electricity generating element through pumps. However, the present invention is not limited to such structures. The fuel cell system of the present invention alternatively includes a structure wherein a fuel and an oxidant are provided in a diffusion manner.

A fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9 that stores fuel, and a pump 11 that is connected therewith. The fuel pump 11 supplies fuel stored in the tank 9 with a predetermined pumping power.

The oxidant supplier 7, which supplies the electricity generating element 3 with an oxidant, is equipped with at least one pump 13 for supplying an oxidant with a predetermined pumping power. The electricity generating element 3 includes a membrane-electrode assembly 17 that oxidizes hydrogen or the fuel and reduces the oxidant, and separators 19 and 19' that are respectively positioned at opposite sides of the membrane-electrode assembly and supply hydrogen or the fuel, and the oxidant, respectively.

The following examples illustrate the present invention in more detail. However, it is understood that the present invention is not limited by these examples.

EXAMPLE 1

WP as a first catalyst, Pt—Ru black (Johnson Matthey Co.) as a second catalyst, and NAFION/$H_2O$/2-propanol (Solution Technology Inc.) in a 5 wt % concentration as a binder were mixed in a weight ratio of 44 wt %, 44 wt %, and 12 wt % to prepare a catalyst composition for an anode. Next, the catalyst composition for an anode was coated on a carbon paper including 0.2 mg/cm$^2$ of carbon to prepare an anode respectively loaded with first and second catalysts in 2 mg/cm$^2$ (in total 4 mg/cm$^2$).

88 wt % of Pt black (Johnson Matthey Co.) catalyst and 12 wt % of NAFION/$H_2O$/2-propanol (Solution Technology Inc.) in a 5 wt % concentration as a binder were mixed to prepare a composition for a cathode. The composition for a cathode was coated on a carbon paper including 1.3 mg/cm$^2$ of carbon to prepare a cathode loaded with a catalyst in a 4 mg/cm$^2$.

The prepared anode and cathode and a commercially-available NAFION 115 (perfluorosulfonate) polymer electrolyte membrane were used to prepare a unit cell.

EXAMPLE 2

A unit cell was fabricated according to the same method as in Example 1, except that WN was used instead of WP for the first catalyst.

EXAMPLE 3

A unit cell was fabricated according to the same method as in Example 1, except that WS was used instead of WP for the first catalyst.

Comparative Example 1

A unit cell was fabricated according to the same method as in Example 1, except that the first catalyst was not used and Pt—Ru black catalyst (Johnson Matthey Co.) was used in an amount of 88 wt %.

Comparative Example 2

A unit cell was fabricated according to the same method as in Example 1, except that WC was used instead of WP for the first catalyst.

Each unit cell fabricated according to Example 1, and Comparative Examples 1 and 2 was measured regarding its power density at 0.4V and 70° C., and the result is provided in the following Table 1

TABLE 1

|  | Example 1 | Comparative Example 1 | Comparative Example 2 |
|---|---|---|---|
| Power density (mW/cm²) | 110 | 100 | 90 |

As shown in Table 1, the unit cell of Example 1 that includes tungsten phosphide turned out to have an improved power density compared to that of Comparative Example 1 that includes only a Pt—Ru black catalyst. In addition, even though it included a half less Pt—Ru black catalyst than Comparative Example 1, it still had better power density. Accordingly, the Pt—Ru black catalyst can be replaced with tungsten phosphide, which is less expensive than the Pt—Ru black catalyst. Furthermore, the present invention can prevent activity deterioration due to sintering of a Pt—Ru catalyst, and thereby improve catalyst activity.

Comparative Example 2 using tungsten carbide turned out to have lower power density than Comparative Example 1.

Therefore, an electrode according to the present invention includes a tungsten-containing compound as a main catalyst and also a small amount of a noble-metal-based catalyst, which is conventionally used as a catalyst, and thereby, can have economic advantage and excellent activity.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A fuel cell, comprising:
    a membrane-electrode assembly comprising:
        a cathode;
        an anode disposed spaced apart from the cathode; and
        a polymer electrolyte membrane interposed between the cathode and the anode, with at least one of the anode and the cathode comprising:
        an electrode substrate; and
        a catalyst layer arranged on the electrode substrate, the catalyst layer including:
            a first catalyst including a tungsten-containing compound, the tungsten-containing compound comprising at least one compound selected from a group consisting of tungsten phosphide, tungsten sulfide, and combinations thereof, and
            a second catalyst including a noble metal, with the first and second catalysts being physically mixed; and
    separators arranged on each side of the membrane-electrode assembly.

2. The fuel cell of claim 1, wherein the tungsten-containing compound comprises tungsten phosphide.

3. The fuel cell of claim 1, wherein the second catalyst includes the noble metal selected from a group consisting of Pt, Ru, Pd, Au, Rh, Ag, Ir, Os, Re, and combinations thereof.

4. The fuel cell of claim 1, wherein the first catalyst and the second catalyst comprise a physical mixture.

5. The fuel cell of claim 4, wherein the first catalyst and the second catalyst are mixed in a weight ratio of 99 to 50:1 to 50.

6. The fuel cell of claim 1, wherein the second catalyst is supported on the first catalyst.

7. The fuel cell of claim 6, wherein 0.01 to 50 parts by weight of the second catalyst is supported on 99.99 to 50 parts by weight of the first catalyst.

8. The fuel cell of claim 1, comprising an anode of the fuel cell.

9. A fuel cell, comprising:
    a membrane-electrode assembly comprising:
        an anode and a cathode facing towards each other;
        a polymer electrolyte membrane interposed between the cathode and the anode; and
        an electrolyte interposed between the anode and the cathode, at least one of the anode and cathode including:
            an electrode substrate, and
            a catalyst layer arranged on the electrode substrate, the catalyst layer including:
                a first catalyst including a tungsten-containing compound, the tungsten-containing compound comprising at least one compound selected from a group consisting of tungsten phosphide, tungsten sulfide, and combinations thereof, and
                a second catalyst including a noble metal, with the first and second catalysts being physically mixed; and
    separators arranged on each side of the membrane-electrode assembly.

10. The fuel cell of claim 9, wherein the second catalyst includes the noble metal selected from a group consisting of Pt, Ru, Pd, Au, Rh, Ag, Ir, Os, Re, and combinations thereof.

11. The fuel cell of claim 9, wherein the first catalyst and the second catalyst comprise a physical mixture.

12. The fuel cell of claim 11, wherein the first catalyst and second catalyst are mixed in a weight ratio of 99 to 50:1 to 50.

13. The fuel cell of claim 9, wherein the second catalyst is supported on the first catalyst.

14. The fuel cell of claim 13, wherein 0.01 to 50 parts by weight of the second catalyst is supported on the 99.99 to 50 parts by weight of the first catalyst.

15. A fuel cell system, comprising:
   at least one electricity generating element including:
      a membrane-electrode assembly including:
         a cathode;
         an anode; and
         a polymer electrolyte membrane interposed between the cathode and the anode; and
      separators arranged on each side of the membrane-electrode assembly;
   a fuel supplier to supply a fuel to the at least one electricity generating element; and
   an oxidant supplier to supply an oxidant to the at least one electricity generating element;
   wherein at least one of the anode and the cathode includes:
      an electrode substrate; and
      a catalyst layer arranged on the electrode substrate, the catalyst layer including:
         a first catalyst including a tungsten-containing compound, the tungsten-containing compound comprising at least one compound selected from a group consisting of tungsten phosphide, tungsten sulfide, and combinations thereof, and
         a second catalyst including a noble metal, with the first and second catalysts being physically mixed.

* * * * *